US012388932B2

(12) United States Patent
Madden et al.

(10) Patent No.: US 12,388,932 B2
(45) Date of Patent: Aug. 12, 2025

(54) TARGETED VISITOR NOTIFICATIONS

(71) Applicant: ObjectVideo Labs, LLC, Tysons, VA (US)

(72) Inventors: Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 646 days.

(21) Appl. No.: 17/752,947

(22) Filed: May 25, 2022

(65) Prior Publication Data
US 2022/0385767 A1 Dec. 1, 2022

Related U.S. Application Data

(60) Provisional application No. 63/239,522, filed on Sep. 1, 2021, provisional application No. 63/193,872, filed on May 27, 2021.

(51) Int. Cl.
H04M 11/02 (2006.01)
G08B 3/10 (2006.01)
G08B 25/00 (2006.01)
H04M 11/04 (2006.01)

(52) U.S. Cl.
CPC ......... *H04M 11/025* (2013.01); *G08B 3/1016* (2013.01); *G08B 25/005* (2013.01); *H04M 11/04* (2013.01)

(58) Field of Classification Search
CPC ... H04M 11/025; H04M 11/04; G08B 3/1016; G08B 25/005; G08B 3/10; G08B 13/19695; G08B 25/014
See application file for complete search history.

(56) References Cited

U.S. PATENT DOCUMENTS

| 5,570,083 | A | 10/1996 | Johnson |
| 5,673,016 | A | 9/1997 | Lutes |
| 6,218,938 | B1 | 4/2001 | Lin |
| 8,154,391 | B1 | 4/2012 | Morris |
| 8,786,425 | B1 | 7/2014 | Hutz |
| 10,289,917 | B1 | 5/2019 | Fu et al. |
| 10,990,499 | B2 | 4/2021 | Moeller |
| 11,064,167 | B2 | 7/2021 | Siminoff |
| 11,086,493 | B2 | 8/2021 | Badr et al. |
| 11,158,067 | B1 | 10/2021 | Modestine et al. |
| 11,315,394 | B1 | 4/2022 | Jackson et al. |
| 11,468,721 | B2 | 10/2022 | Conrad et al. |
| 2003/0179096 | A1 | 9/2003 | Hanan |
| 2005/0007451 | A1 | 1/2005 | Chiang |
| 2008/0118045 | A1* | 5/2008 | Polozola ............. H04M 11/007 379/167.14 |
| 2010/0148957 | A1 | 6/2010 | Ortiz et al. |
| 2010/0289618 | A1 | 11/2010 | Crucs |

(Continued)

Primary Examiner — James J Yang
(74) Attorney, Agent, or Firm — Fish & Richardson P.C.

(57) ABSTRACT

Methods, systems, and apparatus, including computer programs encoded on computer storage media, for providing targeted notifications. One of the methods includes determining a likely identity of a visitor who arrived at a property that is associated with two or more people, selecting, from the two or more people, a target person using the likely identity of the visitor, and sending, to a device of the target person, a notification that indicates that the visitor arrived at the property.

19 Claims, 4 Drawing Sheets

(56) References Cited

U.S. PATENT DOCUMENTS

| | | |
|---|---|---|
| 2010/0289644 A1 | 11/2010 | Salvin et al. |
| 2011/0148653 A1 | 6/2011 | Lin et al. |
| 2013/0017812 A1* | 1/2013 | Foster ................. H04L 12/2825 |
| | | 340/5.7 |
| 2015/0156031 A1 | 6/2015 | Fadell et al. |
| 2015/0163412 A1 | 6/2015 | Holley et al. |
| 2015/0228167 A1* | 8/2015 | Scalisi ............. G08B 13/19695 |
| | | 340/326 |
| 2015/0341603 A1 | 11/2015 | Kasmir et al. |
| 2015/0347910 A1 | 12/2015 | Fadell et al. |
| 2016/0044287 A1 | 2/2016 | Scalisi et al. |
| 2016/0379458 A1 | 12/2016 | Eyring et al. |
| 2019/0130175 A1* | 5/2019 | Nakashima .......... G06V 40/174 |
| 2020/0267354 A1 | 8/2020 | Siminoff |
| 2020/0372773 A1 | 11/2020 | Higley et al. |
| 2021/0134100 A1 | 5/2021 | LaRovere et al. |
| 2021/0398139 A1 | 12/2021 | Zhang et al. |
| 2021/0398400 A1 | 12/2021 | Scalisi |
| 2022/0021684 A1 | 1/2022 | Mensah et al. |
| 2022/0070415 A1 | 3/2022 | Trundle et al. |
| 2022/0295019 A1 | 9/2022 | Madden et al. |

\* cited by examiner

TARGETED VISITOR NOTIFICATIONS

CROSS-REFERENCE TO RELATED APPLICATION

This application claims the benefit of U.S. Provisional Application No. 63/193,872, filed May 27, 2021 and U.S. Provisional Application No. 63/239,522, filed on Sep. 1, 2021, the contents of which are incorporated by reference herein.

TECHNICAL FIELD

This disclosure relates to home monitoring technology.

BACKGROUND

Doorbells are used by visitors to indicate when the visitors have arrived at a property. For example, a visitor may press a doorbell at a front door so that a doorbell chime plays within a home and indicates that someone is at the front door.

SUMMARY

Techniques are described for targeted visitor notifications. When a visitor comes to a front door of a building, there are several ways residents might be notified that the visitor has arrived. For example, a doorbell chime may be played, a mobile application on mobile computing devices used by the residents may display a notification about the visitor's arrival, or text messages may be sent to the mobile computing devices. In another example, assistive devices such as flashing lights or vibration alerts may indicate a visitor's arrival. In a multi-person household or an office environment, all residents may be notified indiscriminately, or in some cases only one designated resident might always be the one notified regardless of who the visitor is actually there to see. Accordingly, residents may be unnecessarily disturbed by notifications about visitors.

A system may recognize which resident the visitor likely wants to interact with, and notify that resident. When the system is able to recognize which resident the visitor likely wants to interact with, the system may attempt to disturb as few residents as possible in order to properly deal with the visitor or connect them with the resident.

In general, one innovative aspect of the subject matter described in this specification can be embodied in methods that include the actions of determining a likely identity of a visitor who arrived at a property that is associated with two or more people, selecting, from the two or more people, a target person using the likely identity of the visitor, and sending, to a device of the target person, a notification that indicates that the visitor arrived at the property.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining the likely identity of the visitor who arrived at the property that is associated with the two or more people can include determining the likely identity of the visitor who arrived at the property, each person in the two or more people associated with the property being a resident, an employee, or both, of the property.

In some implementations, determining the likely identity of the visitor who arrived at the property that is associated with the two or more people can include: detecting an object within a threshold distance of the visitor who arrived at the property; determining, using object recognition, that the object is a specific object that has a frequency of being detected within the threshold distance of a particular visitor. The frequency can satisfy a frequency threshold. In response to determining that the object is the specific object that has the frequency that satisfies the frequency threshold, some implementations can include determining that the visitor is likely the particular visitor.

In some implementations, determining the likely identity of the visitor can include determining that the visitor likely belongs to a group of people. Selecting the target person can include selecting the target person using an identifier for the group of people. Determining that the visitor likely belongs to the group of people can include determining that the visitor is likely a delivery person.

In some implementations, selecting the target person can include selecting the target person using the likely identity of the visitor and calendar information for at least one person from the two or more people, the at least one person including the target person. Selecting the target person can include: determining, using the likely identity of the visitor, that the visitor is likely at the property to visit a first person from the two or more people; determining, using a status of the first person, that the first person is likely unavailable to visit the visitor; and in response to determining that the first person is likely unavailable to visit the visitor, selecting the target person. Determining that the first person is likely unavailable to visit the visitor can use the calendar information for the first person.

In some implementations, determining that the first person is likely unavailable to visit the visitor can use an availability status on a first device for the first person. Selecting the target person can use the calendar information for the target person.

In some implementations, selecting the target person can include selecting the target person using the likely identity of the visitor and one or more messages, each message for at least one of the two or more people.

In some implementations, selecting the target person can include selecting the target person using the likely identity of the visitor and a relationship graph that includes i) two or more first nodes, each first node representing a corresponding one of the two or more people, ii) one or more visitor nodes, each visitor node representing known visitors to the property, and iii) one or more links, each link a) connecting a first node from the two or more first nodes and a visitor node from the one or more visitor nodes and b) representing historical interactions between a person represented by the first node and the visitor node.

In some implementations, the method can include, after sending, to the device for presentation to the target person, the notification that indicates that the visitor arrived at the property: monitoring an interaction between the target person and the visitor; and updating the relationship graph using data representing the interaction between the target person and the visitor.

In some implementations, selecting the target person can include selecting a group of at least two people from the two or more people using the likely identity of the visitor, the group of at least two people including the target person.

In some implementations, selecting the group of at least two people can include: determining, using the likely identity of the visitor, that the visitor is likely at the property to visit a first person from the two or more people; sending, to a first device for presentation to the first person, a first notification that indicates that the visitor arrived at the property; after sending the first notification, determining that the first person likely will not greet the visitor; and in response to determining that the first person likely will not greet the visitor, selecting the group of at least two people.

In some implementations, selecting the group of at least two people can include: determining, from the two or more people associated with the property, a subset of the two or more people who are currently at the property; and selecting, from the subset, the group of at least two people that does not include a class of people from the subset of the two or more people who are currently at the property.

The subject matter described in this specification can be implemented in various embodiments and may result in one or more of the following advantages. In some implementations, sending notifications to only a device associated with a target person instead of multiple devices can reduce computer resource usage.

In some implementations, selecting a target person by considering the classes of the residents and the visitors, e. g., not notifying a child to the presence of an unrecognized visitor, can increase the overall security of a property, e.g., a home or business. In some implementations, categorizing visitors into certain classes can reduce overall computer resource usage, as the exact identity of a visitor need not be determined, e.g., while still limiting a number of devices to which a notification is sent. For example, identifying a visitor as a delivery person or as a friend of a resident can be sufficient to determine the target person without using additional computer resources to determine the identity, e. g., the legal name, of a visitor.

In some implementations, the disclosed target person selection can avoid unnecessarily disturbing residents or employees who are not involved with a visit. In some implementations, the disclosed target person selection can reduce the amount of time taken for visitor to reach the correct resident or employee, which can reduce wait times. In some examples, reduced wait times can, in commercial settings, improve throughput, customer satisfaction, or both.

In some implementations, using a dynamically-constructed hierarchy, e.g., a dynamically-constructed relationship graph, can increase the likelihood of a correct selection of a target person. Considering a relationship graph representing relationships between residents and visitors, calendar information for the residents, and the class of a visitor can increase the likelihood of a system accurately identifying a relationship between a visitor and a resident.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
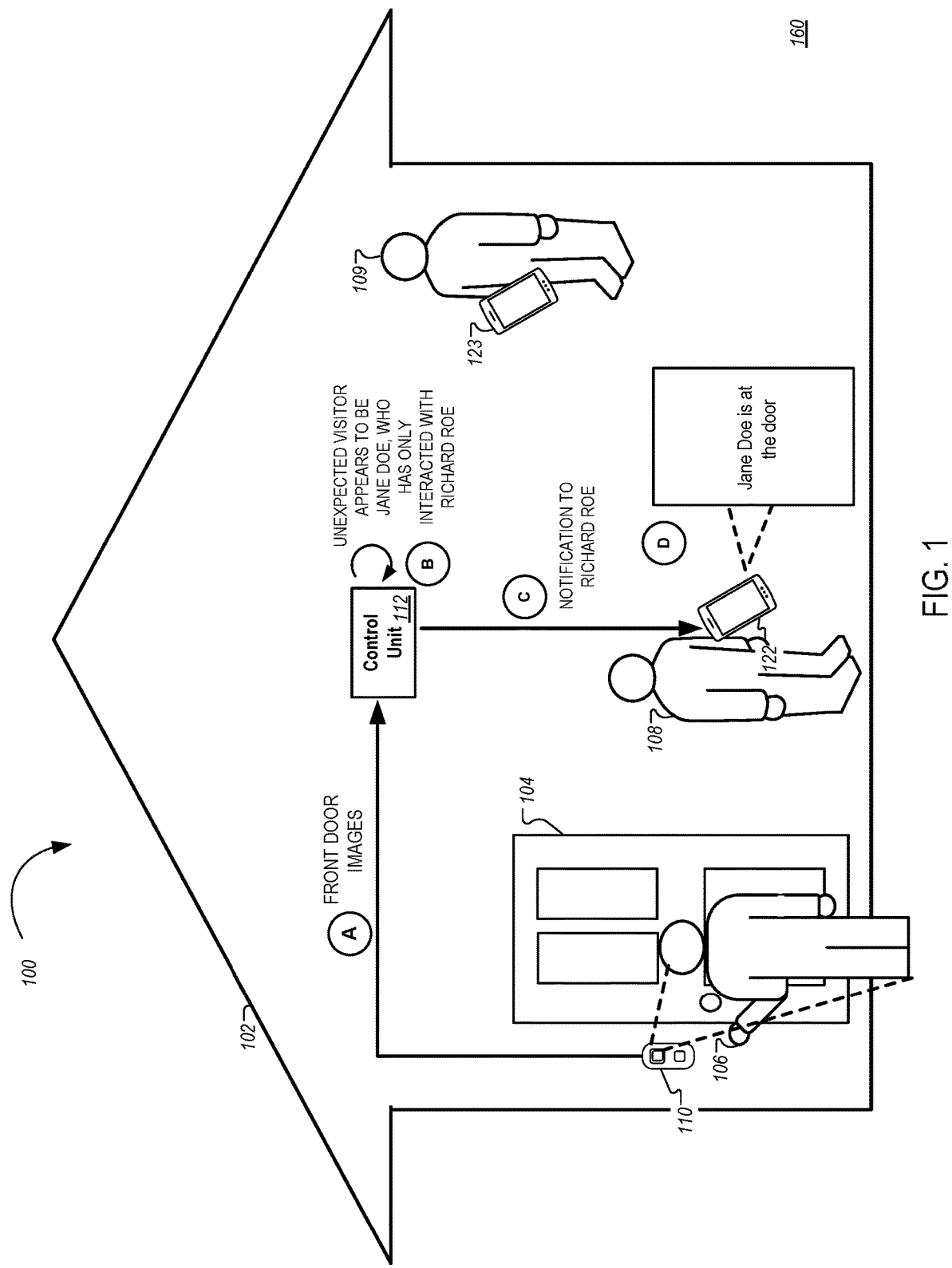
FIG. 1 illustrates a diagram of an example system that enables targeted visitor notifications.

FIG. 1 illustrates a diagram of an example system 100 that enables targeted visitor notifications. The system 100 includes a camera 110 that captures images of visitors, a control unit 112 that uses the images to detect when visitors 106 arrive at the residence 102, a resident device 122 that is used by the resident 108 and receives notifications of visitor arrivals, and a second resident device 123 that is used by a second resident 109 that also receives notifications of visitor arrivals.

The camera 110 captures images of visitors that arrive at the residence 102. For example, the camera 110 may be a doorbell camera that is embedded within a doorbell that is located next to the front door 104 of a residence. In another example, the camera 110 may be a standalone camera that is positioned above the front door 104 and pointed downwards towards the ground in front of the front door 104. The camera 110 may provide images to the control unit 112. For example, the camera 110 may provide a continuous stream of images to the control unit 112 over a wired connection. In another example, the camera 110 may only provide images to the control unit 112 when the camera 110 detects motion, and may provide the images wirelessly over a home wireless network or a cellular connection.

The control unit 112 may be a physical computing device located within the residence 102. For example, the control unit 112 may be affixed to a wall inside the residence 102 and include a touch interface that residents may use to interact with the control unit 112. The control unit 112 may receive the images and determine when a visitor has arrived at the residence 102 based on the images. For example, the control unit 112 may determine from the images that a human is within three feet, six feet, nine feet, or some other predetermined distance from the camera 110 and, in response, determine that the human has arrived at the residence 102. In another example, the control unit 112 may determine that a human is standing within a particular pre-defined region on the ground and, in response, determine that the human has arrived at the residence 102. Additionally or alternatively, the control unit 112 may detect that a doorbell has been pressed and, in response, determine a visitor has arrived at the residence 102 based on the doorbell press.

In response to determining that a visitor 106 has arrived at the residence, the control unit 112 may determine a likely identity of the visitor 106. For example, the control unit 112 may determine that the visitor 106 is Jane Doe. In another example, the control unit 112 may determine that the visitor 106 is a shipping delivery person. In yet another example, the control unit 112 may determine that the visitor 106 is a person that has interacted with a particular resident multiple times. The likely identity of the person may define who the person is or a category that includes the person.

The control unit 112 may determine the likely identity of the visitor 106 based on facial recognition. The control unit 112 may receive an image that shows a face of the visitor 106 and determine whether the face corresponds to faces registered with the control unit 112. For example, the control unit 112 may receive an image that shows an entirety of the face of the visitor 106, and determine that the face likely matches a face that has been registered as belonging to "Jane Doe." The control unit 112 may perform facial recognition based on obtaining images of faces, where each of the images is associated with a particular person that is registered. For example, the control unit 112 may be previously trained to recognize a visitor "Jane Doe" with an image of Jane Doe's face labeled with the identity "Jane Doe."

In some implementations, the control unit 112 may recognize unregistered visitors and determine the likely identity of a visitor 106 as a particular unregistered person. For example, the control unit 112 may determine that the visitor 106 is likely a particular person who is not registered but only interacts with "Richard Roe." The control unit 112 may determine a likely identity of a particular unregistered person based on storing data that indicates historical interactions between visitors and residents, and learning which visitors interact with which residents based on the stored data. For example, the control unit 112 may determine that an unregistered person with a particular face only interacted with "Richard Roe." In another example, the control unit 112 may determine that an unregistered person with a particular face interacted with both "Richard Roe" and "Rebecca Roe," but not the resident "Joe Bloggs."

Additionally or alternatively, the control unit 112 may determine the likely identity of the visitor 106 based on calendars of residents. For example, the control unit 112 may determine that the visitor 106 is likely "Jane Doe" based on determining a stored calendar of "Richard Roe" includes an entry "Jane Doe visiting." The control unit 112 may determine the likely identity of the visitor 106 based on determining that an entry, that corresponds to a current time and is in a calendar of a resident, indicates a particular person is visiting. For example, the control unit 112 may determine that a calendar entry starts at a time that is within five minutes of a current time and indicates that "Jane Doe" is visiting and, in response, determine the visitor 106 is likely "Jane Doe." In yet another example, the control unit 112 may determine that a calendar entry starts at a time that is within five minutes of a current time and indicates that "Richard Roe" is expecting a visit without providing a name of the visitor and, in response, determine an identity of "Visitor for Richard Roe" for the visitor 106.

Additionally or alternatively, the control unit 112 may determine the likely identity of the visitor 106 through object recognition. For example, the control unit 112 may determine that the visitor 106 cannot be facially recognized but is holding a package and is dressed in a package delivery service uniform, and a delivery truck is visible in the image and, in response, determine an identity of "package delivery person" for the visitor 106. In some implementations, the control unit 112 may recognize a specific vehicle in the driveway and that recognition may influence a confidence score of an identification of the visitor. For example, if the control unit 112 determines that in the past the arrival of a blue station wagon has been associated with "Rebecca Roe," the control unit 112 may use the presence of a blue station wagon in the driveway as a hint that this visitor may be Rebecca Roe, assuming the control unit 112 has not already identified a different visitor that is already at the property as Rebecca Roe. In some implementations, the person/vehicle correlation may not be weighted as high as facial recognition, but it may be one factor in identifying the visitor.

In some implementations, the control unit 112 can determine the likely identity of the visitor 106 using object recognition. The control unit 112 can using object recognition with or without facial recognition. For example, the control unit 112 might have recorded a historical correlation between the arrival of a blue station wagon and a visitor for resident Joe Bloggs. In some implementations, the control unit 112 can recognize a specific vehicle in the driveway and that recognition may cause the confidence score of an identification of the visitor to be high enough to skip, e.g., with facial recognition, identification of the visitor.

Additionally or alternatively, the control unit 112 may determine the likely identity of the visitor 106 through tracking movement of the visitor 106. For example, the control unit 112 may track the visitor 106 going door to door through images from the camera 110 and determine an identity of "door to door salesperson," which is treated differently than a person who pulls up in front of the house and walks directly to the door. In another example, the control unit 112 may determine that a visitor at an office suite is a "guest" if images from the camera 110 show that the elevator the visitor exited came from the lobby, and a "coworker" if the elevator came from an access controlled floor.

In some implementations, the control unit 112 may determine a confidence score of the identity that was determined. The confidence score can represent a likelihood that the control unit 112 accurately determined the corresponding identity. For example, the control unit 112 may determine a confidence score of 100% if a face in the image is determined to exactly match a face registered for a particular visitor and match no other registered face. In another example, the control unit 112 may determine a confidence score of 50% if a face in the image is determined to partially match a face registered for a particular visitor. In yet another example, the control unit 112 may determine a confidence score of 80% if a face in the image is determined to partially match a face registered for a particular visitor and an entry in a calendar indicates that the particular visitor is scheduled to visit at that time.

The control unit 112 may determine a target resident to notify based on the likely identity of the visitor. For example, the control unit 112 may determine to notify the resident "Richard Roe" based on the likely identity of "Jane Doe" determined for the visitor 106. In some implementations, the control unit 112 may determine that the visitor likely belongs to a group of people and select the target person using an identifier for the group of people. For example, the control unit 112 may determine to notify the resident "Joe Bloggs" based on the identity of "delivery person" determined for the visitor 106.

The control unit 112 may determine the target resident to notify based on stored data regarding historical interactions. For example, the control unit 112 may determine from the stored data that the visitor "Jane Doe" only previously interacted with resident "Richard Roe" and, in response, determine to notify the resident "Richard Roe" based on determining an identity of "Jane Doe" for the visitor.

Determining a target resident to notify based on historical interactions may include identifying interactions beyond answering a door. For example, to determine a target resident to notify, the control unit 112 may look for historical interactions where residents let a visitor into the residence, residents were the last resident to interact with the visitor, where during the visit residents talked the most to the visitor out of any other resident, or a combination of two or more of these.

Additionally or alternatively, the control unit 112 may determine the target resident to notify based on calendar information of the residents, including the target resident. For example, the control unit 112 may determine to notify the resident "Richard Roe" based on seeing that the resident's calendar indicates that "Jane Doe" is expected to visit at 1 PM, that the visitor 106 is likely "Jane Doe," and that the current time is within ten minutes of 1 PM. Additionally or alternatively, the control unit 112 may determine the target resident to notify based on scheduled deliveries of the residents. For example, the control unit 112 may determine to notify the resident "Richard Roe" based on seeing that an identity of the visitor 106 is package delivery person, the resident "Richard Roe" has a scheduled delivery for that day, and no other resident has a delivery scheduled for that day.

In some implementations, the control unit 112 may generate a notification hierarchy based on determining the target resident to notify. The notification hierarchy may indicate an order of residents to try notifying that the visitor has arrived. For example, the notification hierarchy may indicate that if the target resident is unavailable to answer the door, another particular resident should be notified of the visitor's arrival. The factors that the notification hierarchy uses to try to notify may be based on one or more of identity of the visitor, determined target person or persons of the visit, importance (if at all) that the target person be the one to answer the door, confidence score that indicates a likelihood that the determination of the target person is accurate, which persons have an availability status, e. g., are at the residence, which persons have an unavailable status, e. g., in a "do not disturb" state, whether the notified person answered the door, one or more messages between the visitor and the target person and other residents, or priority of the visit.

For example, the control unit 112 may determine that the identity of the visitor 106 is "emergency response personnel" and, in response, generate a notification hierarchy that indicates to immediately notify all residents in the residence. In another example, the notification hierarchy may indicate that the resident "Richard Roe" should be notified of the visitor's arrival first, but if the resident "Richard Roe" does not open the door within fifteen seconds, the resident "Joe Bloggs" should be notified. In yet another example, the notification hierarchy may indicate that the resident "Richard Roe" should be notified of the visitor's arrival first, but if the resident does not open the door within fifteen seconds, all other residents in the residence 102 should be notified of the visitor's arrival by playing of a doorbell chime through speakers in the residence 102.

In some implementations, generation of the notification hierarchy may exclude certain residents except for specific circumstances. For example, the control unit 112 may generate notification hierarchies that exclude notifying a child resident unless the visitor is determined with a high likelihood to be visiting the child resident. In some implementations, the control unit 112 may determine that a visitor is not visiting specifically to interact with the child resident and, based on that determination, generate a notification hierarchy that suppresses a doorbell chime and instead notify all adult residents at the residence 102 that the visitor has arrived. For example, the control unit 112 may determine that a pizza delivery person pressed a doorbell and that parents have indicated that notifications may not be provided to children for visitors that are a pizza delivery person, and, in response, generate a notification hierarchy that indicates to simultaneously notify all adult residents at the residence, and not notify the child, that the visitor 106 has arrived.

In some implementations, the control unit 112 can determine, using the likely identity of the visitor 106, that the visitor 106 is likely at the property to visit a first person, e. g., resident 108, from two or more people. The control unit 112 can determine, using a status of a first person from the two or more people, that the first person is likely unavailable to visit the visitor 106. In response to determining that the first person is likely unavailable to visit the visitor, the control unit 112 can select the target person, e. g., second resident 109. In some implementations, determining that the first person is likely unavailable to visit the visitor includes using the calendar information for the first person, an availability status on a first device for the first person, or both. In some implementations, selecting the target person includes using the calendar information for the target person.

In some implementations, the control unit 112 may generate the notification hierarchy based on templates. For example, an administrator or resident may specify a template that states if a visitor is determined to be highly likely to be visiting a particular resident, then notify just that resident, where the resident is a variable. The control unit 112 can determine that a visitor is highly likely to be visiting a particular resident when the control unit 112 determines that a likelihood that the visitor is visiting the particular resident satisfies a likelihood threshold. Accordingly, in the example, when the control unit 112 determines a visitor is highly likely to be visiting a specific resident "John Doe," the control unit 112 selects the template and generates a notification hierarchy based on using the specific resident "John Doe" as the variable in the template. The template can indicate a value for the likelihood threshold. In another example, a template may specify that if a visitor is a delivery person, then immediately notify all adult residents that are currently at the residence 102.

In some implementations, the targeted notifications described above for the residence 102 may similarly be performed for other types of properties, such as in a context of the office, e. g., for general persons instead of residents such as employees. In the office context, the control unit 112 may additionally include factors such as the office resident that answers the door on a per visit, per day, always, or some other basis or which office residents are authorized to interact with visitors. Accordingly, the notification hierarchy may prioritize notifying only those office residents that are expected to interact with visitors on the particular basis or are authorized to interact with visitors.

The resident device 122 may receive the notification from the control unit 112. The resident device 122 can present the notification to the resident 108. For example, the resident device 122 may receive the message of "Jane Doe is at the door" sent by the control unit 112, and display the message along with vibrating and playing a sound associated with a notification.

In some implementations, the resident device 122 may determine that the resident 108 has not interacted with the resident device 122 within a predetermined amount time after the notification is provided that a visitor has arrived and, in response, provide an indication to the control unit 112 that the resident 108 has not interacted with the resident device 122, or taken some other action that indicates the resident 108 saw the message, which may cause the control unit 112 to determine a next resident to notify based on the notification hierarchy. For example, the control unit 112 may provide a notification that a person has arrived through the resident device 122, the resident device 122 may determine that the resident 108 did not interact with the resident device 122 within twenty seconds after the notification was provided, the resident device 122 may then provide an indication to the control unit 112 that the resident 108 has not interacted with the resident device 122, and, in response, the control unit 112 may then determine that the next person to notify according to the notification hierarchy is the second resident 109.

In some implementations, the control unit 112 may further determine whether to determine a next resident to notify according to the notification hierarchy based on whether the resident 108 is moving towards the front door 104. For example, the control unit 112 may receive video from cameras in the residence 102 and determine that even though the resident device 122 indicated that the resident 108 did not interact with the resident device 122 within twenty seconds of providing a notification that the person has arrived, the resident 108 appears to be walking towards the front door 104. Control unit 112 may determine that resident 108 may have heard the notification and is going to open the front door 104, so control unit 112 can determine to not notify the next resident.

In another example, the control unit 112 may receive video from cameras in the residence 102 and determine that the resident 108 did not interact with the resident device 122 within twenty seconds of providing a notification that the person has arrived. The control unit 112 can determine that the resident 108 is likely still sitting watching a television so may not have heard or seen the notification, and, in response, notify the next resident.

Additionally or alternatively, the control unit 112 or resident device 122 may determine whether the resident 108 is likely moving towards the front door 104 using image data, inertial measurement unit (IMU) data, or other movement data that indicates movements of the resident device 122, the resident 108, or both. The IMU data can be a combination of gyroscopic and accelerometer data to capture rotational and translational motion. For instance, the control unit 112 can determine whether the resident 108 is likely moving towards the front door 104 based on determining whether the resident device 122 is moving towards the front door 104. For example, the resident device 122 may determine that the resident 108 is moving towards the front door 104 as the resident device 122 is moving towards the front door.

The second resident device 123 may be similar to the resident device 122 but be used by the second resident 109 instead of the resident 108. For example, the second resident device 123 may be the smartphone of the resident "Joe Bloggs." Accordingly, where the control unit 112 determines to notify the resident "Richard Roe" of the arrival of "Jane Doe" but not notify the second resident "Joe Bloggs," the control unit 112 may suppress a doorbell chime from being played after a doorbell is pressed, and instead send a notification to only the resident device 122 and not the resident device 123.

In some implementations, the functionality described as being performed by the control unit 112 in the residence 102 may instead be performed outside the residence 102. For example, the functionality may be performed by a server that is remote from the residence 102 but in communication with the camera 110 and the resident device 122.

Figure 2:
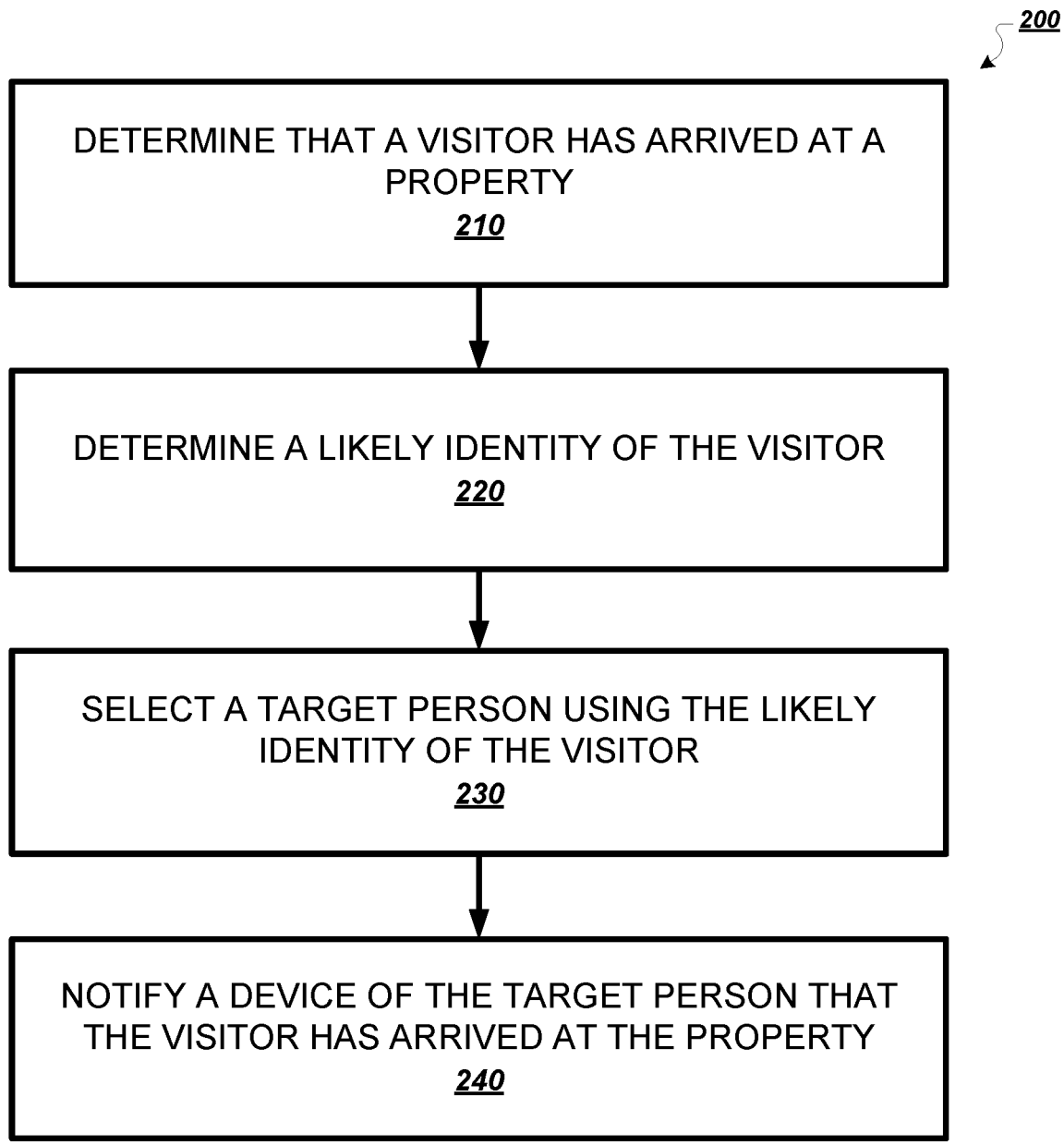
FIG. 2 illustrates a flowchart of an example process that enables targeted visitor notifications.

FIG. 2 illustrates a flowchart of an example process 200 that enables targeted visitor notification. The process 200 may be performed by the control unit 112 or some other device.

The process 200 includes determining that a visitor has arrived at a property (210). The property can be a residence, a business, or a combination of both. For example, the camera 110 may detect motion, capture an image of the visitor 106 at the front door 104 of a residence 102, and then provide the image to the control unit 112. In the example, the control unit 112 may then perform human detection on the image and recognize the visitor 106 is shown in the image. In another example, the control unit 112 may determine that a visitor has arrived as a doorbell has been pressed.

The process 200 includes determining a likely identity of the visitor (220). For example, the control unit 112 may perform facial recognition. As part of the facial recognition process, the control unit 112 can calculate a high confidence score that indicates a strong match between a gathered and one or more stored images of the visitor. The stored images of all visitors can be updated over time, and the control unit 112 can use them in a creating a stored facial recognition model. Given the high confidence score, e.g., that satisfies a confidence threshold, the control unit 112 can determine that the visitor 106 is likely a registered visitor "Jane Doe." In another example, the control unit 112 may perform facial recognition and object recognition, and determine that the visitor 106 is likely a pizza delivery person with a face that is not registered. In yet another example, the control unit 112 may perform facial recognition and determine that the visitor 106 is likely an unregistered visitor that has only interacted with the resident "Richard Roe." In some implementations, the visitor can be associated with two or more people associated with the property, e. g., a visitor who is a babysitter could be associated with two parents and a child.

The process 200 includes selecting a target person using the likely identity of the visitor (230). For example, the property can be associated with two or more people, such as two people in a family or two roommates. The control unit 112 may determine that the visitor "Jane Doe" has only interacted with the resident "Richard Roe" and, in response, determine that the target resident is "Richard Roe." In another example, the control unit 112 may determine that the visitor "Jane Doe", who visits multiple residents, appears only in the calendar of resident "Richard Roe" as visiting at the current time and, in response, determine that the target resident is "Richard Roe." In yet another example, the control unit 112 may determine that the visitor is a "package delivery person" and that only the resident "Richard Roe" has a package delivery scheduled for the current day and, in response, determine that the target resident is "Richard Roe."

In some implementations, more than one visitor 106 might arrive at the property at substantially the same time. The control unit 112 can determine whether the more than one visitor 106 should be treated as a group of visitors or as individual visitor. In some implementations, the control unit 112 can use visual cues to determine how to treat the visitors, e. g., whether the visitors 106 exited the same vehicle, whether the visitors 106 walked to the front door 104 together, whether the visitors 106 interacted with each other as they approached the front door 104, whether the visitors 106 ring the doorbell individually, or a combination of two or more of these. The control unit 112 can use historical data about individual visitors and how they relate to each other to determine how to treat the visitors, e. g., whether individual visitors have visited before, who individual visitors were visiting at the property, whether individual visitors have visited at the same time before, or a combination of two or more of these. In some implementations, the control unit 112 can consider the type of property in determining whether multiple visitors 106 should be treated individually or as a group. For example, it might be more appropriate for the control unit 112 to treat multiple visitors 106 arriving at once as a group at a residence compared to a business, where unrelated visitors arrive at once more often. In some implementations, the control unit 112 can consider the time of year in determining whether multiple visitors 106 arriving at once should be treated as a group or individually, e. g., Halloween or other holidays when multiple unrelated visitors tend to arrive at once.

In some implementations, if the control unit 112 recognizes at least one but not all of multiple visitors 106 arriving at once, the control unit 112 can determine to notify the appropriate target person based on the recognized visitors. In some implementations, the number of visitors 106 arriving at roughly the same time at a property can determine the target person, e. g., a particular employee may always handle groups larger than a certain size at a business, whether or not the control unit 112 treats the multiple visitors 106 individually or as a group.

In some implementations, selecting the target person includes selecting a group of at least two people from the two or more people using the likely identity of the visitor. The group of at least two people includes the target person. In these implementations, selecting the group of at least two people can include determining, using the likely identity of the visitor, that the visitor is likely at the property to visit a first person from the two or more people and sending, to a first device for presentation to the first person, a first notification that indicates that the visitor arrived at the property. After sending the first notification, the control unit 112 can determine that the first person likely will not greet the visitor. In response to determining that the first person likely will not greet the visitor, the control unit 112 can select the group of at least two people, e.g., which group does not include the first person. This can occur when Richard Roe does not answer the door and the control unit 112 selects the group of at least two people that includes Richard's two roommates, Jack and Jill.

In some implementations, selecting the group of at least two people can include determining, from the two or more people associated with the property, a subset of the two or more people who are currently at the property. The control unit 112 can select from the subset, the group of at least two people that does not include a class of people from the subset of the two or more people who are currently at the property. In some implementations, children or other people at high risk when opening a door can be the class of people not selected by the control unit 112.

The process 200 includes notifying a device of the target person that the visitor has arrived at the property (240). For example, the control unit 112 may send a notification to a device that indicates that the visitor arrived at the property. The control unit 112 can send the notification to the device to cause the device to present the notification. The notification can include the text "Jane Doe has arrived". The control unit 112 can send the notification to the application on the resident device 122. In another example, the control unit 112 may trigger a Short Message Service (SMS) text message of "Jane Doe has arrived" to the resident device 122.

Figure 3:
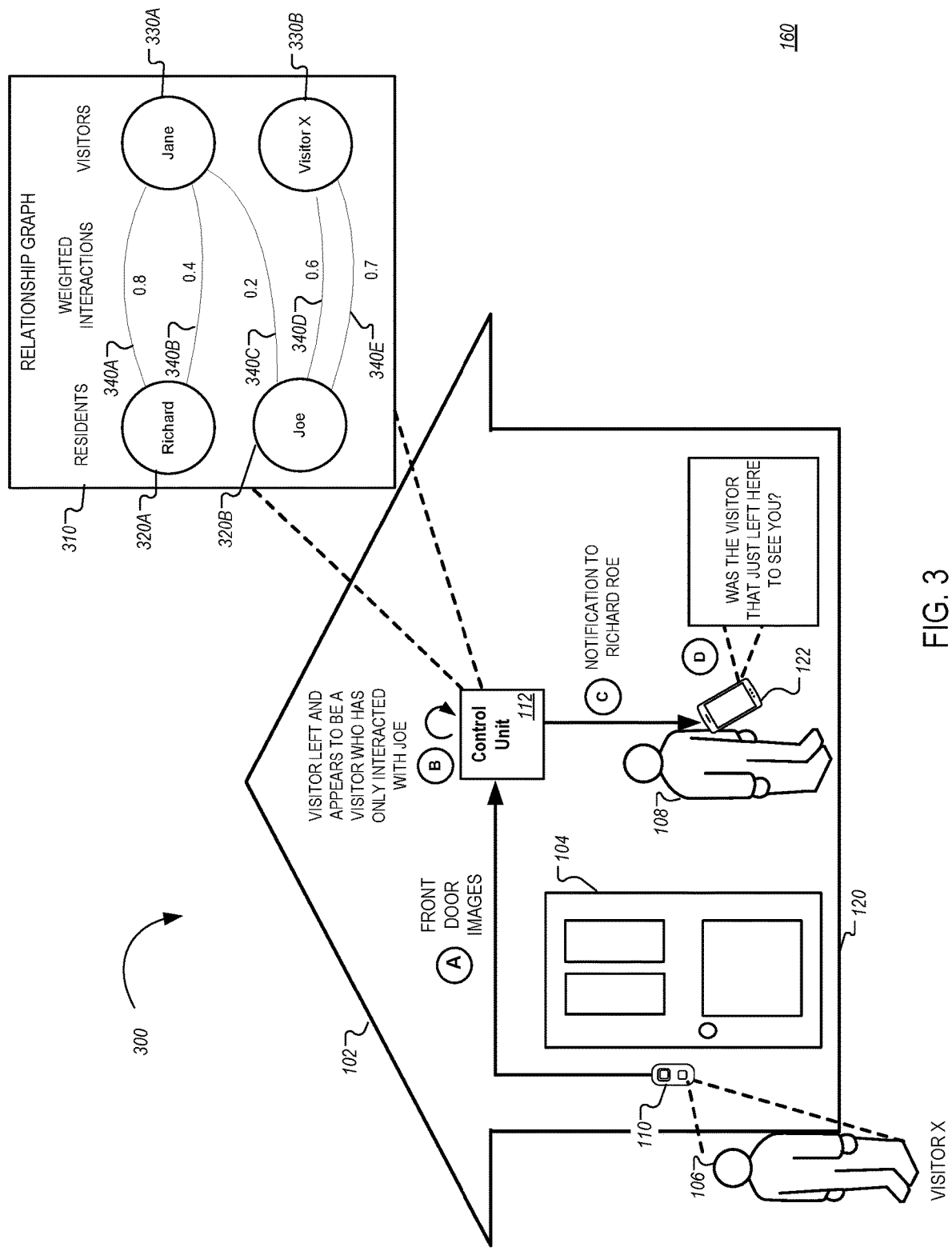
FIG. 3 illustrates a diagram of an example system that learns relationships about visitors.

FIG. 3 illustrates a diagram of an example system 300 that learns relationships about visitors. The system 300 may be similar to the system 100 in that the system 300 includes the camera 110 that captures images of visitors, the control unit 112, and the resident device 122 that is used by the resident 108. However, the system 300 is shown in FIG. 3 as providing a notification that requests confirmation whether a visitor was visiting a particular resident.

The system 300 stores data that indicates historical interactions between visitors and residents in the form of a relationship graph 310. The system 300 can use the relationship graph as one example of a hierarchy used to determine a resident to notify given a likely visitory at the residence 102. The relationship graph 310 includes resident nodes 320A, 320B (collectively referred to as 320) that represent residents of the residence 102, visitor nodes 330A, 330B (collectively referred to as 330) that represent visitors, and links 340A-340E that represent historical interactions between the resident and visitors. The links 340A-340E may be labeled with weights that represent a significance of the interaction. Higher significances may indicate higher likelihood that the visitor was visiting the resident, and lower significances may indicate lower likelihood that the visitor was visiting the resident.

For example, the link 340A represents where Jane interacted with Richard for a long time during a first visit and is associated with a weight of 0.8, the link 340B represents where Jane interacted with Richard for a moderate time during a second visit and is associated with a weight of 0.4, the link 340C represents where Jane interacted with Joe for a short time during a third visit and is associated with a weight of 0.2, the link 340D represents where unregistered Visitor X interacted with Joe for a moderate time during a fourth visit and is associated with a weight of 0.6, and the link 340E represents where unregistered Visitor X interacted with Joe for a moderate time during a fifth visit and is associated with a weight of 0.7. While the examples show weights as values between 0 to 1.0, going from lower significance to higher significance, other values for weights may be used. For example, weights may be grades of A-F or percentages.

The control unit 112 may update, e.g., add or remove or otherwise modify, nodes and links to the relationship graph 310 as interactions occur. For example, the control unit 112 may add the link 340B after the control unit 112 determines that Jane left after interacting with Richard for thirty minutes. In another example, the control unit 112 may add a new visitor node with a new link to Joe after the control unit 112 determines that a new visitor arrived and interacted with Joe.

In some implementations, after the control unit 112 has sent a notification that indicates that a visitor arrived at a property to a device for presentation to a target person, the control unit 112 can monitor the interaction between the target person and the visitor, e.g., use cameras from within the residence 102 to record the interaction. Then, the control unit 112 can update the relationship graph 310 using data representing the interaction between the target person and the visitor.

The control unit 112 may assign weights to the links based on what type of interaction(s) have been observed in the past and how those may predict future interactions. For example, if Jane rings the doorbell and Joe answers the door, that interaction alone may result in a new link with a low weight, e.g., 0.2, between Jane and Joe. However, if the control unit 112 then observes that Joe lets Jane into the house, and Joe and Jane talk for 3 hours, that would add more significant weight, e.g., 0.9, to a new link between Jane and Joe. The control unit 112 may determine a length of time that people interact and whether a visitor enters the house based on video from cameras within the residence 102.

The control unit 112 may assign weights based on a variety of factors including the frequency of interaction between a particular resident/visitor pair, whether the visitor enters the house, which resident actually interacts with the visitor (e.g., the greeter may not necessarily be the one primarily interacting with the visitor), length of interaction post-greeting, online interaction history if the in-person visitor is associated with an online identity, resident's body language, facial expression, voice-tone during the visit (e.g., whether the resident happy to see the visitor), and which resident sees the visitor off. For example, the control unit 112 may assign a higher weight when the control unit 112 determines that a visitor interacted with a resident more recently, the control unit 112 may assign a higher weight when the control unit 112 determines that a visitor entered the house, the control unit 112 may assign a higher weight when the control unit 112 determines that the visitor and resident made physical contact, the control unit 112 may assign a higher weight when the control unit 112 determines that there was a longer post-greeting interactions, the control unit 112 may assign a higher weight when the control unit 112 determines that visitors and residents have more online interaction history, e.g., messages between visitors and residents through user devices such as texts, emails, or social media contact, and the control unit 112 may assign a higher weight when the control unit 112 determines that the resident appears happier seeing the visitor.

The control unit 112 can consider the frequency of interaction as a numerical or other type of quantifiable value in determining the likely visitor. In some implementations, the control unit 112 can consider whether a frequency of interactions between a visitor and each person of the multiple people at a property satisfies a frequency threshold.

When a visitor arrives, the control unit 112 may select a target person to notify based on the likely identity of the visitor and the relationship graph 310. For example, the control unit 112 may determine that Visitor X has arrived, determine from the relationship graph 310 that Visitor X only interacted with Joe, and, in response, determine to notify only Joe that Visitor X has arrived. In another, the control unit 112 may determine that Jane has arrived, determine from the relationship graph 310 that the Jane/Richard pair has a weight of 1.2 based on summing the weights of the two links 340A, 340B identified for the pair, determine from the relationship graph 310 that the Joe/Jane pair has a weight of 0.2 based on identifying one link 340C for the pair, determine that 1.2 is greater than 0.2, and, in response, notify Richard instead of Joe that Jane is visiting.

In some implementations, the control unit 112 may request confirmation that a visitor was visiting a particular resident. For example, the control unit 112 may determine that Visitor X just left and appeared to have been visiting the resident Joe and, in response, provide a notification to the resident device 122 to request that Joe confirm whether Visitor X was visiting Joe. In the example, if Joe responds with a positive confirmation, e.g., yes, the control unit 112 may assign a high weight of 1.0 to a link for the interaction and if Joe responds with a negative, e.g., no, the control unit 112 may not store the interaction as a link between the Joe/Visitor X pair. In another example, the control unit 112 may determine that a response to a confirmation is a negative and determine to remove an existing link between the pair, or store a new link as a counter example, such that a likelihood of a relationship between the pair is reduced.

In some implementations, the control unit 112 may display a representation of the relationship graph 310 to residents in a graphical user interface. For example, the control unit 112 may show all nodes and all links to the user and allow the user to remove links, change nodes for links, and/or change weights of links. In another example, the control unit 112 may simply list likely residents for each visitor, allow users to change the likely resident for each visitor, and then automatically re-weight the links based on the user specified likely resident for each visitor. In yet another example, the control unit 112 may list visitors that correspond to each resident and allow the user to move each visitor to another resident's list.

In some implementations, the stored data may change over time as interactions occur, and more recent interactions may generally be considered more applicable than older interactions. In some implementations, the control unit 112 may reduce a weight of an interactions. For example, the control unit 112 may reduce a weight of an interaction by 2% every day after the interaction occurred. In another example, the control unit 112 may reduce a weight of interactions between 1-2 months ago by 20%, from 2-3 months ago by 50%, and from 3+ months ago by 100% (e.g., removing the interaction from the relationship graph).

In some implementations, the control unit 112 may infer relationships between visitors and residents. For example, the control unit 112 may determine that Joe answered the door when Richard was not home, Jane briefly spoke with Joe and then left (e.g., Joe told Jane that Richard was not home), Joe immediately sent a text message to Richard and, in response, determine that Jane was likely looking for Richard. Consequently, the control unit 112 can store an interaction between Richard and Jane with a low weight. The system 300 may request confirmation from the resident that opened the door before adding the interaction for an inferred relationship. For example, the control unit 112 may send a notification to Joe requesting confirmation that Jane was there to see Richard and, in response to receiving a positive confirmation, add the inferred relationship, and, in response to a negative response, not add the inferred relationship and add an interaction with another resident if Joe indicates Jane was there to see another resident.

In some implementations, the system 300 may recognize relationships between residents and groups or classes of visitors. For example, a group or class of visitors may be a food delivery person, a pizza delivery person, a package delivery person, a lawn care provider, a snow shoveler, a browsing customer, a returning item customer, a customer seeking assistance, a customer approaching a kiosk/desk, etc. The system 300 may learn which resident interacts most with different groups or classes of visitors. For example, the control unit 112 may recognize that Richard answers the door and accepts a pizza and, even after an extended period with no interacts with pizza delivery people, the control unit 112 may store that Richard frequently is associated with pizza deliveries.

The group or class of visitors for a specific visitor may be determined by the control unit 112. For example, the control unit 112 may identify pizza-delivery visitors by delivery vehicle, uniform, or by the shape/appearance of what they are carrying. In some implementations, the groups or classes of visitors and rules for identifying the groups or classes may be predefined.

In some implementations, the system 300 may recognize relationships of groups or classes of residents. For example, the control unit 112 may learn that browsing customers are greeted by and interact with a certain set of employees. The system 300 may also learn certain affordances and actions taken when visitors are greeted and assist. For example, the control unit 112 may learn to guide a visitor to a certain place where like visitors are normally greeted or learn to adjust lighting/music/security settings automatically based on actions greeters have typically taken.

For situations in which the systems discussed here collect personal information about users, e. g., residents and visitors, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a visitor's identity may be anonymized so that no personally identifiable information can be determined for the visitor, or a user's geographic location may be generalized where location information is obtained (such as to a city, ZIP code, or state level), so that a particular location of a user cannot be determined. Thus, the user may have control over how information is collected about him or her and used.

Figure 4:
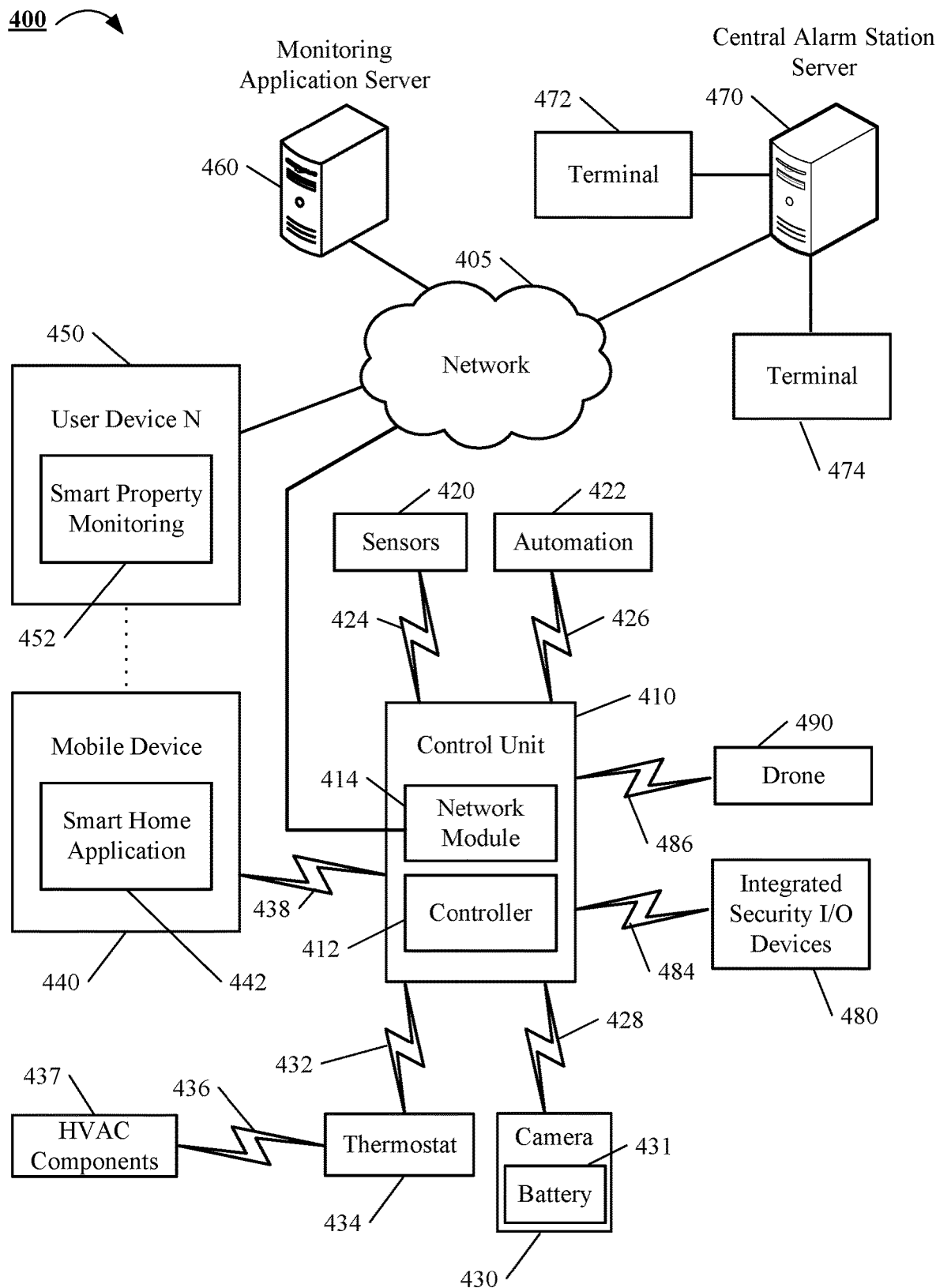
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 are connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 or general robotic device can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 436, 438, 484, and 486. The communication links 424, 426, 428, 432, 436, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 436, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more of the modules 422, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452, e. g., smart home monitoring, that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through communication link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and sends data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
determining a likely identity of a visitor who arrived at a property that is associated with two or more people, wherein determining the likely identity of the visitor who arrived at the property that is associated with the two or more people comprises:
detecting an object within a threshold distance of the visitor who arrived at the property;
determining, using object recognition, that the object is a specific object that has a frequency of being detected within the threshold distance of a particular visitor, which frequency satisfies a frequency threshold; and
in response to determining that the object is the specific object that has the frequency that satisfies the frequency threshold, determining that the visitor is likely the particular visitor;
selecting, from the two or more people, a target person using the likely identity of the visitor; and
sending, to a device of the target person, a notification that indicates that the visitor arrived at the property.

2. The method of claim 1, wherein determining the likely identity of the visitor who arrived at the property that is associated with the two or more people comprises determining the likely identity of the visitor who arrived at the property, each person in the two or more people associated with the property being a resident, an employee, or both, of the property.

3. The method of claim 1, wherein:
determining the likely identity of the visitor comprises determining that the visitor likely belongs to a group of people; and selecting the target person comprises selecting the target person using an identifier for the group of people.

4. The method of claim 3, wherein determining that the visitor likely belongs to the group of people comprises determining that the visitor is likely a delivery person.

5. The method of claim 1, wherein selecting the target person comprises selecting the target person using the likely identity of the visitor and calendar information for at least one person from the two or more people, the at least one person including the target person.

6. The method of claim 5, wherein selecting the target person comprises:
determining, using the likely identity of the visitor, that the visitor is likely at the property to visit a first person from the two or more people;
determining, using a status of the first person, that the first person is likely unavailable to visit the visitor; and
in response to determining that the first person is likely unavailable to visit the visitor, selecting the target person.

7. The method of claim 6, wherein determining that the first person is likely unavailable to visit the visitor uses the calendar information for the first person.

8. The method of claim 6, wherein:
determining that the first person is likely unavailable to visit the visitor uses an availability status on a first device for the first person; and
selecting the target person uses the calendar information for the target person.

9. The method of claim 1, wherein selecting the target person comprises selecting the target person using the likely identity of the visitor and one or more messages, each message for at least one of the two or more people.

10. The method of claim 1, wherein selecting the target person comprises selecting the target person using the likely identity of the visitor and a relationship graph that includes i) two or more first nodes, each first node representing a corresponding one of the two or more people, ii) one or more visitor nodes, each visitor node representing known visitors to the property, and iii) one or more links, each link a) connecting a first node from the two or more first nodes and a visitor node from the one or more visitor nodes and b) representing historical interactions between a person represented by the first node and the visitor node.

11. The method of claim 10, comprising:
after sending, to the device for presentation to the target person, the notification that indicates that the visitor arrived at the property:
monitoring an interaction between the target person and the visitor; and
updating the relationship graph using data representing the interaction between the target person and the visitor.

12. The method of claim 1, wherein selecting the target person comprises selecting a group of at least two people from the two or more people using the likely identity of the visitor, the group of at least two people including the target person.

13. The method of claim 12, wherein selecting the group of at least two people comprises:
determining, using the likely identity of the visitor, that the visitor is likely at the property to visit a first person from the two or more people;
sending, to a first device for presentation to the first person, a first notification that indicates that the visitor arrived at the property;
after sending the first notification, determining that the first person likely will not greet the visitor; and
in response to determining that the first person likely will not greet the visitor, selecting the group of at least two people.

14. The method of claim 12, wherein selecting the group of at least two people comprises:
determining, from the two or more people associated with the property, a subset of the two or more people who are currently at the property; and
selecting, from the subset, the group of at least two people that does not include a class of people from the subset of the two or more people who are currently at the property.

15. A system comprising one or more computers and one or more storage devices on which are stored instructions that are operable, when executed by the one or more computers, to cause the one or more computers to perform operations comprising:
determining a likely identity of a visitor who arrived at a property that is associated with two or more people, wherein determining the likely identity of the visitor who arrived at the property that is associated with the two or more people comprises:
detecting an object within a threshold distance of the visitor who arrived at the property;
determining, using object recognition, that the object is a specific object that has a frequency of being detected within the threshold distance of a particular visitor, which frequency satisfies a frequency threshold; and
in response to determining that the object is the specific object that has the frequency that satisfies the frequency threshold, determining that the visitor is likely the particular visitor;
selecting, from the two or more people, a target person using the likely identity of the visitor; and
sending, to a device of the target person, a notification that indicates that the visitor arrived at the property.

16. The system of claim 15, wherein determining the likely identity of the visitor who arrived at the property that is associated with the two or more people comprises determining the likely identity of the visitor who arrived at the property, each person in the two or more people associated with the property being a resident, an employee, or both, of the property.

17. The system of claim 15, wherein:
determining the likely identity of the visitor comprises determining that the visitor likely belongs to a group of people; and
selecting the target person comprises selecting the target person using an identifier for the group of people.

18. The system of claim 17, wherein determining that the visitor likely belongs to the group of people comprises determining that the visitor is likely a delivery person.

19. A non-transitory computer storage medium encoded with instructions that, when executed by one or more computers, cause the one or more computers to perform operations comprising:
determining a likely identity of a visitor who arrived at a property that is associated with two or more people;
selecting, from the two or more people, a target person using the likely identity of the visitor, wherein selecting the target person comprises selecting the target person using the likely identity of the visitor and a relationship graph that includes i) two or more first nodes, each first node representing a corresponding one of the two or more people, ii) one or more visitor nodes, each visitor node representing known visitors to the property, and iii) one or more links, each link a) connecting a first node from the two or more first nodes and a visitor node from the one or more visitor nodes and b) representing historical interactions between a person represented by the first node and the visitor node; and sending, to a device of the target person, a notification that indicates that the visitor arrived at the property.

* * * * *